United States Patent [19]

Kalain et al.

[11] Patent Number: 4,893,781

[45] Date of Patent: Jan. 16, 1990

[54] STEM PACKING ASSEMBLY FOR FREQUENT CYCLING VALVE

[75] Inventors: Terry M. Kalain, Willoughby; Edward M. Yusko Jr., Denmark; Peter C. Williams, Cleveland Heights, all of Ohio

[73] Assignee: Whitey Co., Highland Hts., Ohio

[21] Appl. No.: 196,368

[22] Filed: May 19, 1988

[51] Int. Cl.$^4$ .................. F16K 41/04; F16J 15/20
[52] U.S. Cl. .................... 251/214; 251/148; 251/315; 277/112; 277/121; 277/125; 277/188 A; 277/190; 277/206 A; 277/209
[58] Field of Search ............ 251/214, 148, 315, 316, 251/317; 277/110, 112, 116.8, 117, 124, 125, 188 A, 190, 206 A, 206 R, 209, 211, 121

[56]   References Cited

U.S. PATENT DOCUMENTS

| | | | |
|---|---|---|---|
| 1,502,734 | 7/1924 | Martin | 251/214 |
| 2,735,700 | 2/1956 | Bowman | 277/110 |
| 2,831,714 | 4/1958 | Thorburn | 277/112 |
| 3,172,670 | 3/1965 | Pras | 277/112 |
| 3,419,280 | 12/1968 | Wheeler | 277/124 |
| 3,554,563 | 1/1971 | Schumacher | 277/124 |
| 3,622,168 | 11/1971 | Woodling | 277/206 A |
| 3,733,050 | 5/1973 | Gordon | 251/214 |
| 3,954,251 | 5/1976 | Callahan Jr. et al. | 251/214 |
| 4,234,197 | 11/1980 | Amancharla | 277/125 |
| 4,489,916 | 12/1984 | Stevens | 277/121 |
| 4,538,790 | 9/1985 | Williams et al. | 251/214 |
| 4,558,874 | 12/1985 | Williams et al. | 251/214 |
| 4,560,176 | 12/1985 | Hoff | 277/124 |

FOREIGN PATENT DOCUMENTS 23814  12/1905  Austria ....................... 277/125

Primary Examiner—George L. Walton
Attorney, Agent, or Firm—Fay, Sharpe, Beall, Fagan, Minnich & McKee

[57]    ABSTRACT

A new packing arrangement is provided for improved sealing and limiting potential for extrusion of one packing member relative to another. The stem packing arrangement is disclosed with particular reference to a ball valve assembly having a body housing a selectively rotatable valve member. An actuating stem extends from the body through a stem passage and the packing assembly is received in the passage around a portion of the stem. First, second, third, and fourth members progressively increase in hardness to limit extrusion of one member relative to another. A predetermined compression is also applied to the packing assembly and is independent of the actuating stem so that bearing member life is increased. The second member includes a tapered external surface that cooperates with the stem passage to provide a wedging action along the inner and outer diameter portions thereof. Additionally, the third and fourth members have cooperating slippage surfaces that urge the third member toward sealing engagement with the actuating stem.

12 Claims, 3 Drawing Sheets

STEM PACKING ASSEMBLY FOR FREQUENT CYCLING VALVE

BACKGROUND OF THE INVENTION

This invention pertains to the art of packing arrangements and more particularly to an actuator stem packing arrangement. The invention is particularly applicable to a rotary valve that undergoes frequent cycling and will be described with particular reference thereto. However, it will be appreciated that the invention has broader applications and may be advantageously employed in other packing environments and applications.

Ball valves include a body having a chamber adapted to receive a ball member that is selectively rotated between open and closed positions. Upstream and downstream seat assemblies seal around a through flow passage provided in the ball member. An actuating stem extends from the ball member outwardly through the body to permit selective rotation of the ball member between valve open and closed positions. A stem passage is provided through the valve body to receive the actuating stem. Due to the high fluid pressures associated with these types of valves, particular emphasis is placed on the design of stem packing arrangements to seal between the actuating stem and valve body.

A number of stem packing arrangements have attempted to address this problem in an equally wide variety of manners. The most basic stem packing arrangement is an O-ring that provides a sliding type seal that accommodates rotary movement of the stem. More often, though, the stem packing assembly includes multiple elements that are placed under compression to tightly seal along the external surface of the actuating stem. By way of example, commonly assigned U.S. Pat. Nos. 4,538,790 to Williams, et al. issued Sept. 3, 1985 and 4,558,874 to Williams, et al. issued Dec. 17, 1985 illustrate two multiple element stem packing arrangements that have met with substantial commercial success.

In certain applications, valve cycling, i.e. opening and closing, becomes the primary criterion that must be addressed by the stem packing arrangement. Frequent valve cycling necessarily alters the service life of a valve due to the dynamic forces and effects resulting therefrom. The subject application is particularly applicable to cycling applications on the order of one cycle per second. Under such conditions, the design of the stem packing arrangement must be reexamined in order to accommodate the sealing and bearing function of the stem packing arrangement under such strenuous conditions.

Simultaneously, the stem packing arrangement must accommodate a high pressure environment which, in turn, dictates the design characteristics of the individual packing elements. This unique set of circumstances, that is frequent cycling and high pressure, is not adequately met by prior stem packing designs that would otherwise seem suitable for a particular set of circumstances or another. It has, therefore, been deemed desirable to provide a stem packing arrangement that satisfies these specialized design criterion.

SUMMARY OF THE INVENTION

According to the present invention, there is provided a stem packing arrangement particularly adapted for valves that undergo frequent cycling in a high pressure environment.

According to a more limited aspect of the invention, the valve includes a body having a chamber in which is disposed a valve member selectively rotated between open and closed positions. An actuating stem extends from the chamber and through the body. A packing assembly is received in a stem passage and around a portion of the stem. The packing assembly includes plural members that progressively increase in hardness as the members are stacked outwardly from the chamber.

According to a more limited aspect of the invention, the outermost member threadedly engages the valve body and establishes a predetermined compression on the remainder of the packing assembly.

According to yet another aspect of the invention, the first member is a soft elastomer, the second member is a soft plastic, the third member is a hard plastic, and the fourth member is a metal.

According to still another aspect of the invention, the stem passage includes an inwardly tapering region that matingly engages a tapering portion of the second member.

According to still another aspect of the invention, a spacer is received between the fourth member and the body for establishing of a predetermined compression on the remaining packing assembly.

A principal advantage of the invention is a packing arrangement that remains substantially unaffected even after frequent cycling.

Another advantage of the invention resides in preventing extrusion of one packing member relative to another.

Yet another advantage of the invention resides in the ability to maintain the packing assembly under a predetermined compression.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof, and wherein.

DETAILED DESCRIPTION OF THE PREFERRED EMBODIMENT

Figure 1:
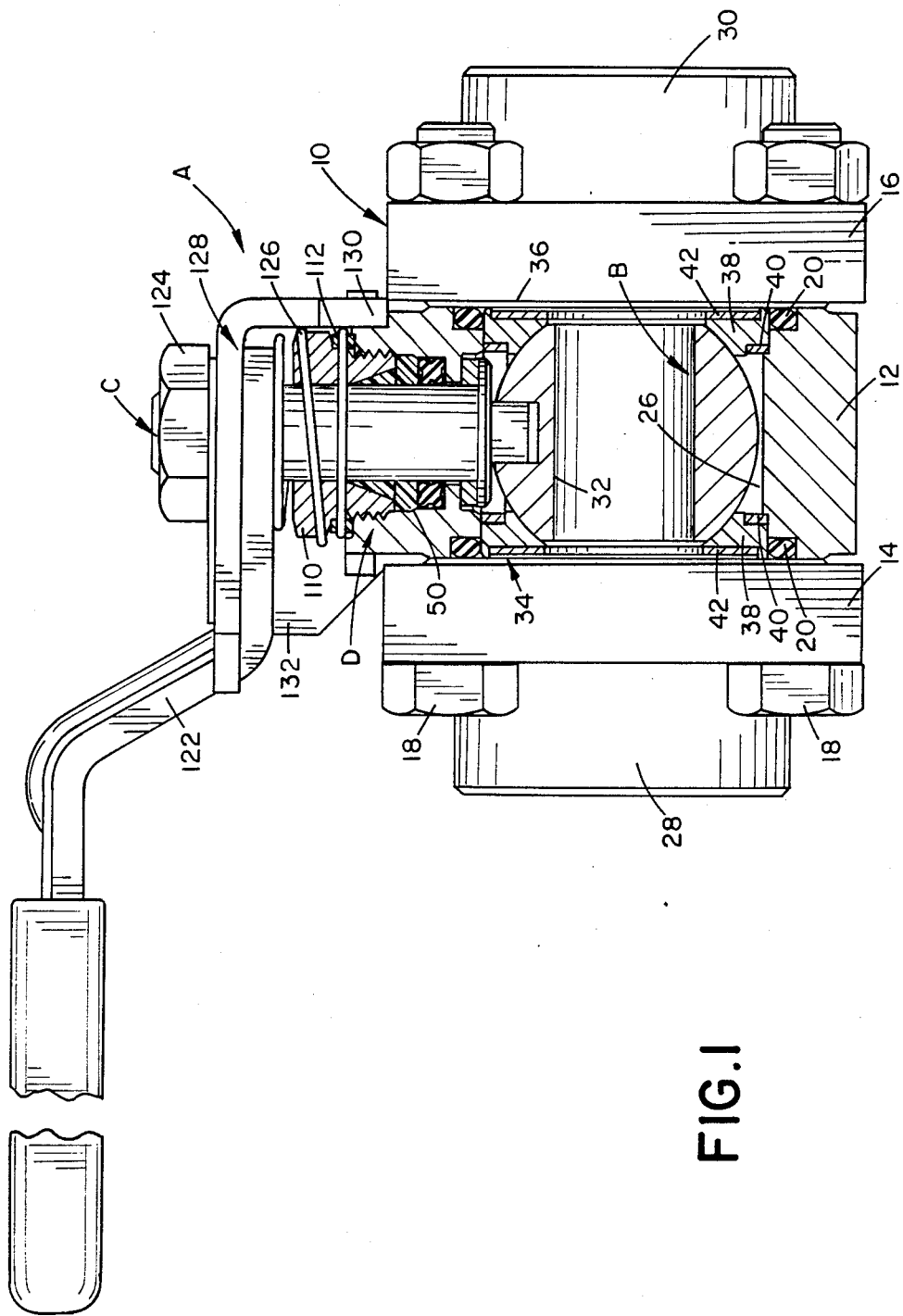
FIG. 1 is a side elevational view of a valve with selected portions shown in cross-section to facilitate an understanding of the subject invention.

Referring now to the drawings wherein the showings are for purposes of illustrating the preferred embodiment of the invention only and not for purposes of limiting same, the FIGURES show a ball valve A having a ball member B adapted for selective rotation between open and closed positions by actuating stem C. An improved packing assembly D seals along the exterior of the stem.

More particularly and with reference to FIG. 1, the ball valve includes a valve body 10 having a central body portion 12 and opposed end members 14, 16. The end members are retained in engagement with the central body portion by a plurality of tie bolts 18 that also provide for a swing-away feature that facilitates maintenance as described in commonly assigned U.S. Pat. No. 3,954,251 to Callahan, Jr., et al., issued May 4, 1976. The disclosure of that patent is incorporated herein by reference so that further discussion is deemed unnecessary. Additionally, a pair of seal members such as 0-rings 20 are disposed between the central body portion and end members.

The valve body includes a cavity or chamber 26 that communicates with an inlet 28 and an outlet 30. The inlet and outlet are adapted for communication with a fluid system through suitable connections with fluid lines (not shown). The ball member B is disposed in the chamber and includes a through passage 32 that is selectively aligned with the inlet and outlet to provide fluid communication therebetween. Upstream and downstream seat assemblies 34, 36 sealingly engage the external surface of the ball member. As shown, the seat assemblies are of identical configuration. Each seat assembly includes a seat member 38, support ring 40, and seat spring 42 that urges the seat member toward sealing engagement with the ball member. Alternate seat assembly constructions may be utilized without departing from the scope and intent of the subject invention.

The actuating stem C extends outwardly from the ball member and through a stem passage 50 defined in the central portion of the valve body. A lower end 52 of the stem is received in an arcuate slot 54 of the ball member to transmit rotational movement of the stem thereto. The operative engagement between the stem and ball member permits selective axial movement of the ball member against the downstream seat assembly in a valve closed position. A stem shoulder 56 and flange 58 extending inwardly from the stem passage receive a bearing member 60 therebetween. Specifically, the bearing member engages a first or lower face 62 of the flange. The fluid pressure in the valve chamber imposes a load on the stem which is transferred to the valve body by the bearing member arrangement. The bearing member is specially constructed for long life and limits wear that would otherwise result from the relative movement between the stem shoulder and flange.

Figure 2:
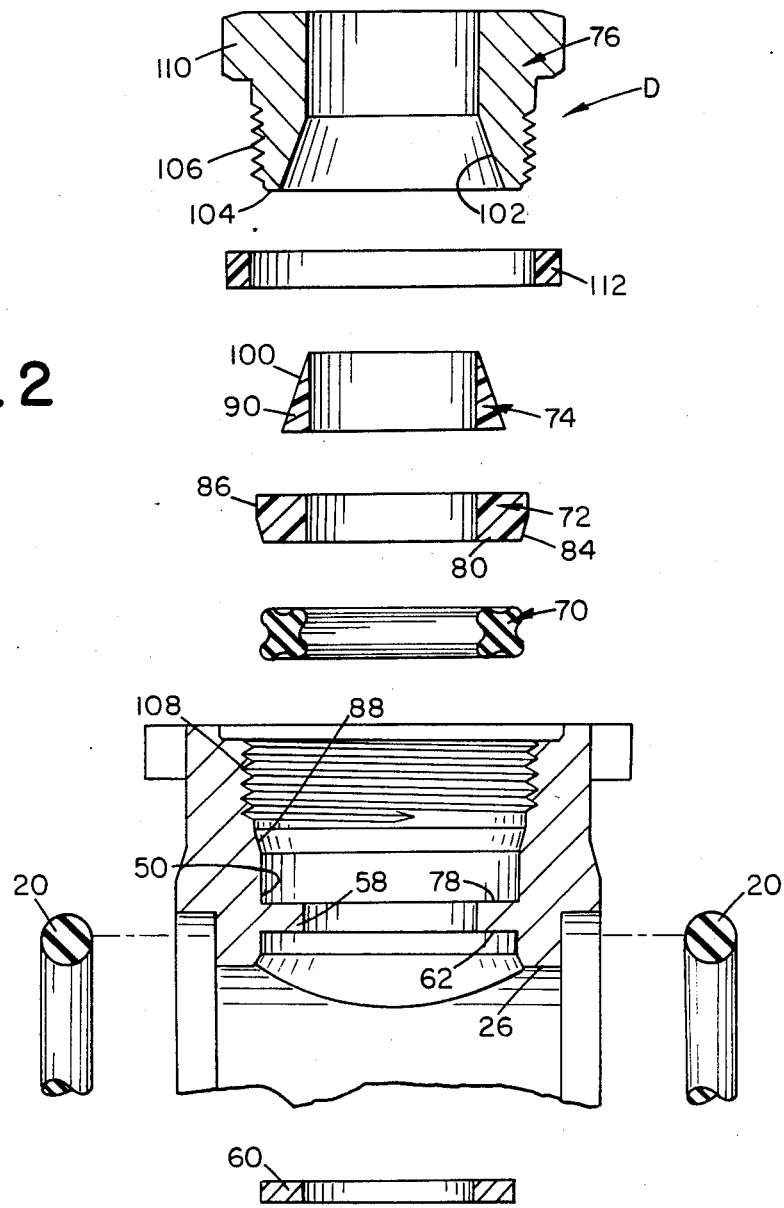
FIG. 2 is an exploded, elevational view of the individual packing components.
Figure 3:
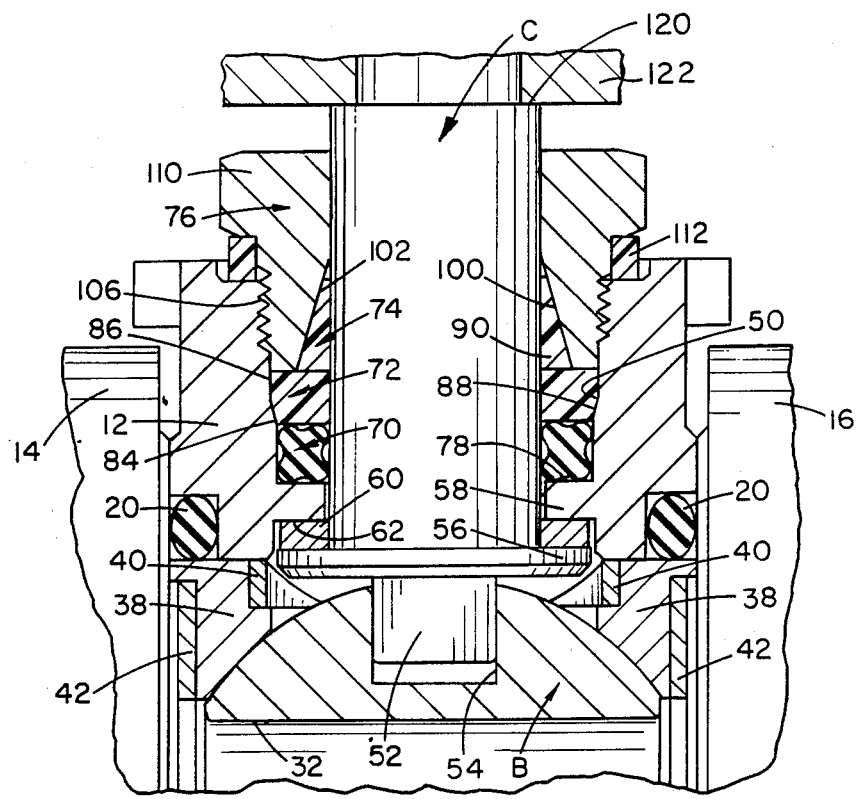
FIG. 3 is an enlarged view of the packing assembly in assembled relation.
Figure 4:
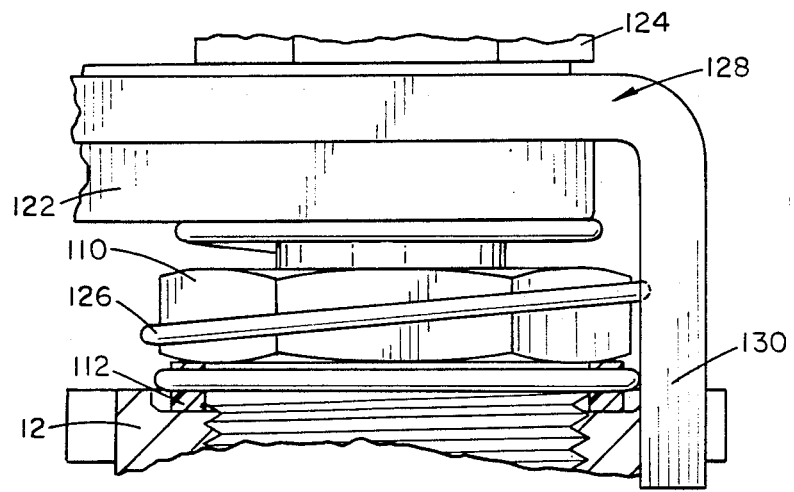
FIG. 4 is an enlarged view of the handle attachment to the actuating stem.

Extending axially outward from the flange along the longitudinal axis of the stem is the subject new packing assembly D. Preferably, the packing assembly includes four cooperating elements, namely, a first packing member 70, second packing member 72, third packing member 74, and fourth member 76 (FIGS. 2 and 3). The first packing member 70 is a multi-lobed seal member such as a Quad-ring, a registered trademark of Minnesota Rubber Company of Minneapolis, Minn. Of course other seal members can be used with equal success and may be preferred for certain design parameters. The first packing member is received on a generally radially extending upper face 78 of the flange. As is apparent, the inner diameter of the first packing member closely approximates that of the actuating stem to provide a sealing engagement therewith. It does, though, permit rotation of the stem to orient the ball member between open and closed positions. Likewise, the outer diameter of the first packing member is closely received in the stem passage for sealing therewith.

The second packing member 72 is disposed axially outward from the first packing member and also is adapted for sealing between the actuating stem and stem passage. A generally planar, first or lower surface 80 engages the first packing member. In order to provide effective sealing, the second packing member includes an external tapering portion 84 that increases in radial dimension as it extends axially outward from the valve chamber and merges into an upper cylindrical portion 86. The tapering portion matingly engages a tapering region 88 of the stem passage. As will be described further hereinbelow, under a predetermined compression the second packing member undergoes a wedging action to close any gaps that may result along both the inner and outer diameters. The wedging action also prevents extrusion of the first packing member outwardly along the stem axis.

The third packing member 74 has a generally frustoconical configuration that reduces in cross-sectional area from a base region 90 as it extends axially outward. The base region 90 engages the upper cylindrical portion 86 of the second packing member along an inner diameter portion but is spaced from the stem passage wall for reasons which will become more apparent below. The inner diameter of the third packing member closely approximates the diameter of the actuating stem to provide an effective back-up surface to the second packing member. The external surface of the third packing member defines a tapered slippage surface 100 that cooperates with a similar surface defined in the fourth member. This structural arrangement also urges the third packing member radially inward toward the actuating stem and limits extrusion of the second packing member therepast.

The stem packing assembly also includes a fourth member 76 sometimes referred to as a "seal keeper" since it axially confines the remainder of the packing assembly in the valve body. As briefly described above, the slippage surface 100 of the third packing member cooperates with a slippage surface 102 of the fourth member. Further, a lower terminus 104 of the fourth member directly engages the second packing member to provide the compression load for the wedging action described above. As is apparent in FIG. 3, the lower terminus fills the radial space defined between the base region of the third packing member and the stem passage wall. An intermediate externally threaded region 106 cooperates with a threaded region 108 in the outer portion of the stem passage to positively engage the seal keeper to the valve body. An enlarged shoulder 110 defined at the axially outer end of the seal keeper cooperates with a spacer ring 112 to limit advancement of the seal keeper into the passage 50. The spacer ring assures that the seal keeper advances a preselected distance into the valve body rather than relying on the threaded arrangement therebetween to define the extent of advancement. In this manner, a predetermined compression is applied to the packing assembly D since the separate packing components are axially received between the flange and seal keeper.

The stem packing arrangement provides a hardness gradient that improves sealing and limits the potential for extrusion of one packing member past another. The packing members increase in hardness as they extend axially outward along the stem axis from a soft elastomer of the first packing member, to a soft plastic of the second packing member, to a hard plastic of the third packing member, to the metal construction of the fourth member. The hardness gradient, wedging action of the second packing member, and cooperating slippage surfaces 100, 102 provide a sealing arrangement along the actuating stem that withstands frequent cycling.

According to this packing assembly, the predetermined compression on the individual components is not tied to the actuating stem as in prior structures. Instead, the predetermined compression is independent of the actuating stem due to the threaded engagement between the seal keeper and the valve body. This arrangement has two-fold advantages. First, the load on bearing member 60 is due to fluid pressure only. That is, no additional loads are placed on the bearing member as in prior arrangements where the compression load on the packing assembly is tied directly to the actuating stem. This results in a longer bearing member life. Secondly, any wear of the bearing member over time has no effect on the predetermined compression of the packing assembly. Any axial outward movement of the actuating stem, however slight, that may result from wear of the bearing member, has no effect on the predetermined compression load on the packing assembly. Again, the independent nature of the compression load relative to the actuating stem provides this advantageous result.

Additionally, the handle is secured by a fastening means such as nut 124 to an actuating stem shoulder 120. The stem shoulder 120 positions the handle a set distance above the fourth member 76 so that rotation of the handle does not effect or slide against the packing assembly.

A grounding spring 126 extends between a lower or under surface of the handle 122 and an upper surface of the valve body. The spring grounds the handle to the body to prevent static electrical discharges in certain process uses of the valve. Additionally, a stop plate 128 is interposed between the handle and nut 124. The stop plate includes a downwardly extending pair of flanges 130, 132 that limit the rotational movement of the ball member.

The invention has been described with reference to the preferred embodiment. Obviously modifications and alterations will occur to others upon a reading and understanding of the specification. It is intended to include all such modifications and alterations insofar as they come within the scope of the appended claims or the equivalents thereof.

Having thus described the invention, it is now claimed:

1. A valve comprising:
a body having a chamber communicating with an inlet and outlet;
a valve member disposed in said chamber for selective rotation between open and closed positions;
an actuating stem operatively associated with said valve member extending outwardly from said chamber through a stem passage defined in said body; and,
a packing assembly received in said stem passage and around a portion of said stem, said packing assembly including first, second, third, and fourth members extending respectively outward from said chamber, said first member disposed closest to said chamber, said second member having a greater hardness than said first member, said third member having a greater hardness than said second member, and said fourth member having a greater hardness than said third member, and engaging said body to establish a predetermined compression on said first, second, and third members wherein said second member has a tapering portion engaging a mating, inwardly tapering region of said stem passage for urging said second member toward said stem and limiting extrusion of said first member therepast, said third and fourth members include first and second slippage surfaces for providing axial slipping engagement therebetween.

2. The valve as defined in claim 1 wherein said fourth member threadedly engages said body for establishing a predetermined compression on said first, second, and third members.

3. The valve as defined in claim 1 wherein said first member is a multi-lobed configuration.

4. The valve as defined in claim 1 wherein said first member is a multi-lobed elastomeric member.

5. The valve as defined in claim 1 wherein said first member is a soft elastomer.

6. The valve as defined in claim 1 wherein said second member is a soft plastic.

7. The valve as defined in claim 1 wherein said third member is a hard plastic.

8. The valve as defined in claim 1 wherein said fourth member is a metal.

9. The valve as defined in claim 1 further comprising a spacer received between an enlarged portion of said fourth member and said body for facilitating establishment of a predetermined compression on said first, second, and third members.

10. The valve as defined in claim 1 further comprising a flange extending inwardly into said stem passage having a first surface generally facing said chamber and a second surface supporting said first packing member.

11. The valve as defined in claim 10 further comprising a bearing member interposed between said flange first surface and a shoulder defined on said actuating stem.

12. The valve as defined in claim 10 wherein said first member is a soft elastomer, said second member is a soft plastic, said third member is a hard plastic, and said fourth member is a metal.

* * * * *